United States Patent [19]
Kruys

[11] Patent Number: 5,555,309
[45] Date of Patent: Sep. 10, 1996

[54] CRYPTOGRAPHIC KEY MANAGEMENT APPARATUS AND METHODS

[75] Inventor: Johannes P. Kruys, Gt. Harmelen, Netherlands

[73] Assignee: NCR Corporation, Dayton, Ohio

[21] Appl. No.: 324,326

[22] Filed: Oct. 17, 1994

Related U.S. Application Data

[63] Continuation of Ser. No. 77,693, Jun. 15, 1993, abandoned.

[30] Foreign Application Priority Data

Jun. 22, 1992 [GB] United Kingdom .................. 9213169

[51] Int. Cl.⁶ .............................. H04L 9/00; H04L 9/30
[52] U.S. Cl. ............................ 380/21; 380/9; 380/30; 380/49
[58] Field of Search .................. 380/9, 21, 30, 380/43, 49, 50

[56] References Cited

U.S. PATENT DOCUMENTS

| | | | |
|---|---|---|---|
| 4,868,877 | 9/1989 | Fischer | 380/25 |
| 4,888,800 | 12/1989 | Marshall et al. | 380/21 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |

FOREIGN PATENT DOCUMENTS 0292790  11/1988  European Pat. Off. .......... H04L 9/00

*Primary Examiner*—Bernarr E. Gregory
*Attorney, Agent, or Firm*—Elmer Wargo

[57] ABSTRACT

The present invention provides for a cryptographic key management method and apparatus in which the cryptographic keys are provided as vector keys in that they comprise a key value and control information for specifying the use to which the key can be put by members of a communications domain. Each domain member is associated with at least one pair of vector keys and the keys in each pair share the same key value. One of the keys in each pair is provided as a public key and specified for encrypting, or verifying the seal of, messages sent from the domain member associated therewith and the other is provided as a private key and specified for decrypting, or generating a seal for, messages sent to the domain member associated therewith.

5 Claims, 2 Drawing Sheets

CRYPTOGRAPHIC KEY MANAGEMENT APPARATUS AND METHODS

This is a continuation of application Ser. No. 08/077,693, filed Jun. 15, 1993, now abandoned.

BACKGROUND OF THE INVENTION

1. Field of Invention

The present invention relates to a cryptographic key management apparatus and method.

2. Background Information

As known in the prior art, the secure interchange of data between entities that make up a distributed system, for example, domain members of a communications domain, requires the use of cryptography. Cryptography requires the distribution and use of cryptographic keys. Conventional key management involves providing respective pairs of domain members with a private key, i.e. a key which is shared between, and only known and used by, the pair of domain members, for communication between the pair of domain members in either direction. As such, the same key is used for encrypting and decrypting a message during communication between two domain members. Thus, it is essential to the security of the domain to keep these keys secret and known only by the intended users. This creates problems for key distribution.

Public key cryptography is also known in which two different but related cryptographic keys are provided and the key belonging to one of the pair of domain members is a public key which need not be kept secret. As such, the public key can be distributed throughout the domain without concern for its security and so the key distribution problem experienced with private keys does not arise. However, one pair of keys allows for communication in one direction only and so two further keys are necessary to implement two-way communication between two domain members.

Conventional key management that involves the use of private keys, is disadvantageous in that a large number of secure keys are required for such symmetrical key usage. The number of secure keys required is the square of the number of members in a particular domain, and this also renders the management and secure distribution of the keys particularly problematic.

Known public, or asymmetrical, key management, is also disadvantageous in that it is relatively expensive to implement and computation intensive and so relatively slow in use.

It is known from U.S. Pat. No. 4,941,176; 4,924,515; and 4,924,514 to control the use of cryptographic keys by means of control information associated with the cryptographic key information. However, the above-mentioned disadvantages are also found in such known systems.

SUMMARY OF THE INVENTION

It is an object of the present invention to provide cryptographic key management apparatus which does not suffer the above mentioned disadvantages and therefore provides for simple key distribution and also a relatively high speed of operation.

According to one aspect of the present invention there is provided cryptographic key management apparatus having a plurality of key means for a plurality of members of a communications domain, each key means comprising a cryptographic key value and control information specifying key usage, characterized in that said plurality of key means comprises a plurality of domain vector keys each paired with a member vector key, each pair of vector keys sharing the same cryptographic key value and the domain vector keys being specified as public keys for data encryption and data seal verification and the member vector keys being specified as private keys for data decryption and data seal generation, wherein said plurality of domain vector keys are located in store means accessible to said plurality of domain members and each domain member is associated with at least one of said pairs, and in that a plurality of master keys are provided to protect the plurality of vector keys.

Such apparatus is advantageous in that a vector key, which is a combination of a key value and control information controlling the use of the key, can be paired with another vector key sharing the same key value but different control information, such that characteristics of asymmetrical key usage can be impressed, by use of the control information of the vector key, onto symmetrical keys. Thus, key management is provided which combines the simple key distribution characteristic exhibited by asymmetrical or public key algorithms with the relatively high speed of operation which is a characteristic of symmetrical key algorithms. As such, a domain member advantageously requires only one vector key to secure messages it transmits, and only one vector key to secure messages it receives. Thus, the total number of keys required is restricted to only twice the number of entities or domain members. However, as mentioned above, the vector keys of each pair share the same cryptographic key value and so a high-speed symmetrical type operation can also be achieved.

Vector key management, as provided by the apparatus of the present invention, also advantageously allows for the storage of cryptographic keys in network directories from which they can be easily retrieved when required. Also vector key management is compatible with the emerging international standards for open system directories, for example the CCITT X.500 directory.

Further advantages arise in that vector key management provides a simplified and open-ended approach to cryptographic key distribution in that the present invention is compatible with other known means of key management and distribution. Also, a vector key is particularly suited to recent advances in the design of secure semiconductor devices that can store cryptographic keys. This further facilitates the use of symmetrical cryptographic keys as if they were asymmetrical.

The apparatus of the present invention therefore provides for secure one-way communication channels between the members of a communications domain or entities of a distributed system. From these communications channels, a variety of secure interaction paths and patterns can be established that support a wide range of applications including simple data communications security and also transaction security.

According to another aspect of the present invention there is provided a method of managing cryptographic keys having a key value and control information for specifying the use of the keys by members of a communications domain, characterized by arranging the cryptographic keys as public and private key pairs which share the same key value, associating at least one pair with each domain member, specifying each public key for data encryption and data seal verification and each private key for data decryption and data seal generation, locating the cryptographic keys in store means accessible to all domain members and by providing master keys to protect the cryptographic keys.

DETAILED DESCRIPTION OF A PREFERRED EMBODIMENT

Figure 1:
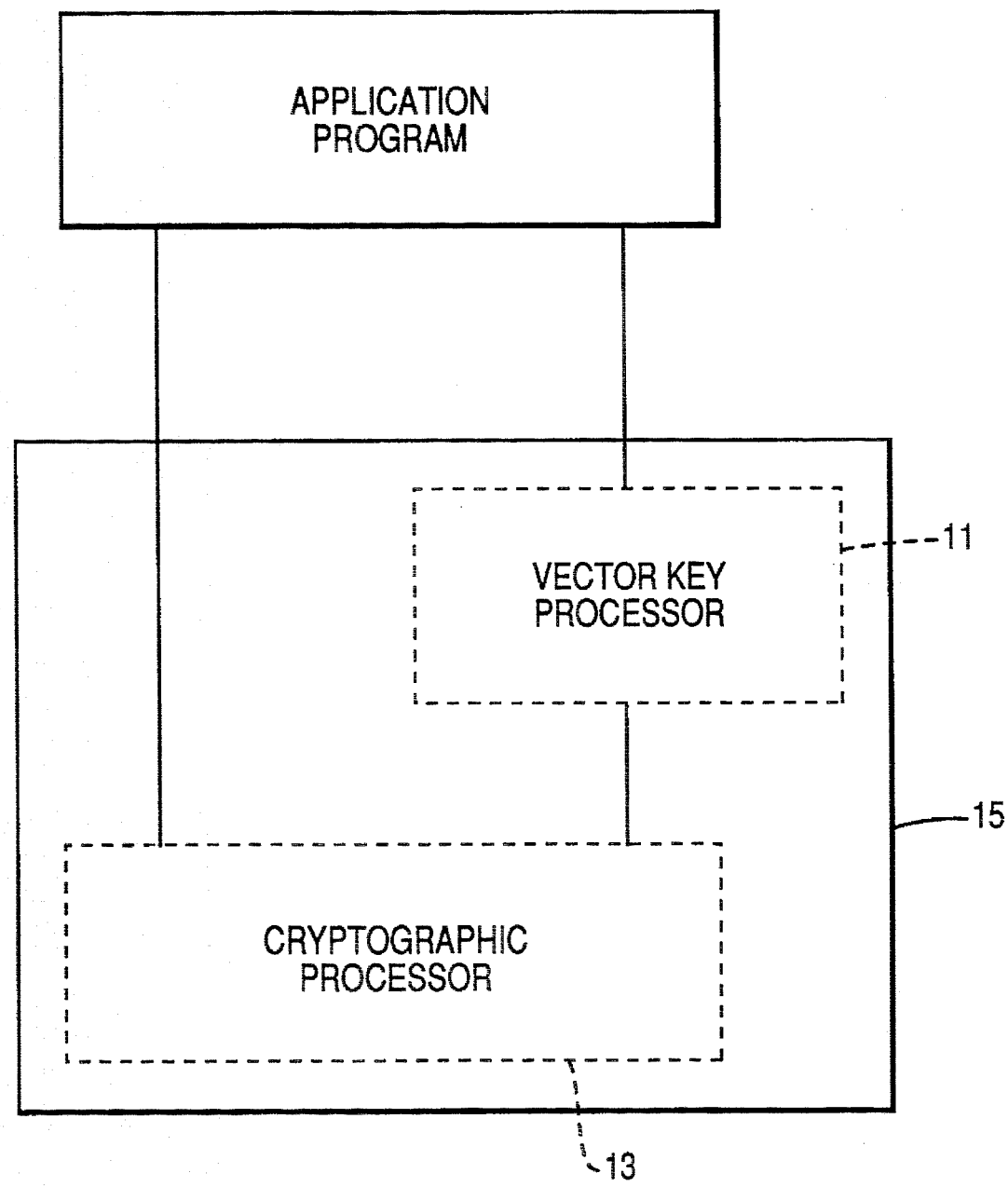
FIG. 1 is a block diagram of part of a cryptographic key management apparatus embodying the present invention.

The invention employs known cryptographic key management concepts such as symmetrical encryption and decryption of information and message authentication using the Data Encryption Standard (DES) algorithm and also public key or asymmetrical cryptography. The invention may also advantageously employ a directory as a means of storing and sharing information throughout a communication domain.

The invention differs from known cryptographic key management functions in that the working keys, i.e. those which control the encryption/decryption of data, comprise vector keys, which comprise a key value and control information, and which are employed as controlled keys providing for one way, or asymmetrical, message encryption or message sealing.

In its operation, vector key management is domain orientated in that the entities or systems, i.e. domain members, that make up the domain, share certain keys and also a store means, or directory, from which the keys can be retrieved as required. Vector key management involves the use of two different types of working keys in addition to master keys, which serve to protect the working keys. These different working keys comprise domain vector keys and member vector keys. The domain vector key is designated a public key and, as such, each of the domain members has access to each domain vector key. The member vector key is designated as a private key in that each member vector key is available to, and known by, only the domain member with which it is associated. The domain vector keys and member vector keys are also further defined by their respective control information such that the domain vector keys, i.e. the public keys, control only message encryption and message seal verification and the member vector keys, i.e. the private keys, control only message decryption and message sealing.

The provision of the above mentioned domain vector keys and member vector keys form part of the operational criteria to be met by apparatus according to a preferred embodiment of the invention. Accordingly, all members of a secure communications domain should be able to encrypt a message but only the intended recipient should be able to decrypt such a message. Likewise all members of a secure communications domain should be able to verify the seal of a message but only one identifiable member should be able to generate a particular seal on a given message. Thus, the domain vector keys, which are employed for message encryption and seal verification, are provided as public keys and the member vector keys, which are employed for message decryption and seal generation, are provided as private keys.

The above requirements can be met by the appropriate distribution of the cryptographic keys. The distribution of keys is greatly facilitated by the use of asymmetrical crypto algorithms which allow the sharing of public keys between domain members and further advantages arise from the present invention in that relatively simple and fast symmetrical crypto algorithms are used in an asymmetrical manner.

The sharing of working keys is greatly facilitated by the sharing of master keys, or key encryption keys. Advantageously, the invention provides a domain master key which is shared by all domain members, and which is used to protect the domain vector keys, and also a plurality of member master keys, each one of which is unique to a respective domain member, and is arranged to protect the respective member vector key of each domain member.

Since domain vector keys are working keys that can be used for encryption or seal verification by any member of a domain, they must be protected in such a way that they are accessible only to the members of that domain. This protection is provided by encrypting the domain key value with a domain master key. This encryption is performed within the crypto processor and is not accessible from outside it. Whenever a domain vector key is created it is encrypted under the domain master key before being stored in the directory or otherwise made public. The domain vector key thereby encrypted appears as a "key value" in the vector key. The domain master key may be a single or a double length key since this makes no difference in principle, but does make cryptographic attack on a domain master key, or on a domain vector key, impractical.

All the domain members have the domain master key in their crypto-processor and therefore they can make use of vector keys that are encrypted by it. These members are also the only ones that can create domain vector keys.

Alternatively, since member vector keys are working keys that can be used for decryption or sealing only by the member of a domain that created that key they must be protected in such a way that they are accessible only to the member of the domain that created them. Also, since a member may have many of these vector keys, they may be stored outside secured cryptographic devices. The required protection is provided by encrypting the member key value with the member master key. This encryption is performed within the crypto processor and is not accessible from outside it. Whenever a member vector key is created it is encrypted under the member master key before being stored on disc or put in a directory or otherwise made public. The member vector key thereby encrypted appears as a "key value" in the vector key. The member master key may be a single or a double length key since this makes no difference in principle, but it does make cryptographic attack on a member master key, or on a member vector key, impractical.

All the domain members have their own member master key in their crypto-processor and therefore they can make use of vector keys that are encrypted by it. They are also the only members that can create the respective member vector keys.

Further security is provided by the present invention in that the use of the master keys is restricted to particular predetermined trusted devices which contain built-in key management functions and which will not misuse either the master keys or the working keys. The provision of devices that will not prejudice the security of the communications domain allows for the sharing of master keys without further compromising security of the domain.

As such, the present invention provides for secure key distribution based on the use of the above-mentioned trusted devices that can employ symmetrical keys as if they were asymmetrical.

The preferred embodiment of the present invention relies particularly on the vector key and the vector key processor. The vector key is a combination of encryption key material and key control information that determines whether a key can be used as a public key or as a private key. The vector key processor is arranged in each member to hold the master keys and also load the vector keys into a cryptographic processor in which the encryption/decryption and sealing/seal verification of the message is carried out. The key material and control information is advantageously provided as a single data structure.

As illustrated in FIG. 1, a vector key processor 11 and a cryptographic processor 13, belonging to each domain member, can be provided on a single semiconductor device 15 which can be accessed by an application program.

The two types of vector keys provided, namely the domain vector key and member vector key, are both according to a preferred embodiment of the invention, stored in a directory that is accessible to all entities or members of a communications domain. Each domain vector key is paired with a member vector key and each domain member is associated with at least one such pair. The two vector keys of each pair contain the same cryptographic key material while the vector control information, and the particular master key used to secure the vector key determine which of the vector keys of each pair is used as a public or private key. The control information of each key specifies the key as either a public key or a private key. In the present invention, the domain vector keys are specified for use in encryption and seal verification of a message and member vector keys are specified for use only for decryption and seal generation. All domain members should be able to encrypt a message and verify the seal on a message so that the domain vector keys are specified as public keys and are accessible to all domain members. However, only the intended recipient of a message should be able to decrypt the message and also generate a seal for a message, and so the member vector keys are specified as private keys and are accessible only to the domain member to which they belong or with which they are associated.

The vector key pairs, when stored in the directory may be sealed by the member master keys so as to provide protection against vector substitution.

Also, operations between different communication domains can be supported by way of key translation facilities that translate vector keys between the domain master keys of the domains.

The vector key of the preferred embodiment of this invention comprises the following: a vector syntax identifier; a domain name identifier; a vector name identifier; a vector type identifier, i.e. indicating whether a key is a domain vector key or member vector key; a key purpose identifier, i.e. whether the key is specified for data encryption/decryption or seal generation/verification; a master key identifier; a key size identifier; a key value; and a seal.

The seal is a Message Authentication Code (MAC) computed according to ANSI X9.19 binary option. The invention allows for the loading of vector keys into the directory by the domain members as required. A further level of protection may be provided by loading the vector keys as attributes into X.509 certificates. The certification means that creates these certificates adds its own public key signature to the certificate thus making it impossible for domain members to register themselves. Such a level of security control may be particularly advantageously employed in networks which are shared by multiple secure communication domains.

As mentioned above, vector key processing is advantageously supported by way of a vector key processor. Such processors are arranged to hold the master keys of the domain members, to use the working keys only as indicated by the key control information and to load the working keys into a cryptographic processor for message encryption/decryption or seal generation/verification as required.

A set of typical operations of a vector key management apparatus is outlined below, which set is arranged to replace the conventional key management operations of known cryptographic hardware and software. It should be noted that vector key management can be employed as a basis for setting up conventional session keys for communication between two network nodes. As such, a first node generates a session key, seals it under its sealing key and encrypts it under the encryption key of the second node. A particularly advantageous implementation of vector key management involves the combination of standard cryptographic operations that support system functions and applications with vector key management operations in a single secure device such as an appropriately designed semiconductor device. Of course, other implementations are possible and appropriate dependent upon factors such as cost and the level of security required.

The typical set of operations to be supported are:

Encryption,

Decryption,

Seal generation,

Seal verification,

Encryption and Seal generation, and

Decryption and Seal verification.

Typical vector key management operations include:

Loading of vector key into processor,

Retrieval of vector key from processor,

Retrieval of key material, and

Creation of vector key.

Typical session key management operations include:

Generate a working key, and

Verify and load the working key.

The invention is now further described with reference to particular operations between two members A and B of a Security domain X and which involve vector keys identified by the expression Vd-n-t-p, Where:
- d—identifies the domain in which the communication occurs;
- n—identifies the domain member associated with, or owner of, the key;
- t—identifies the type of vector key (i.e. whether domain or member); and
- p—identifies the intended use of purpose of the key (i.e. encrypt/decrypt or seal generation/verification).

Figure 2:
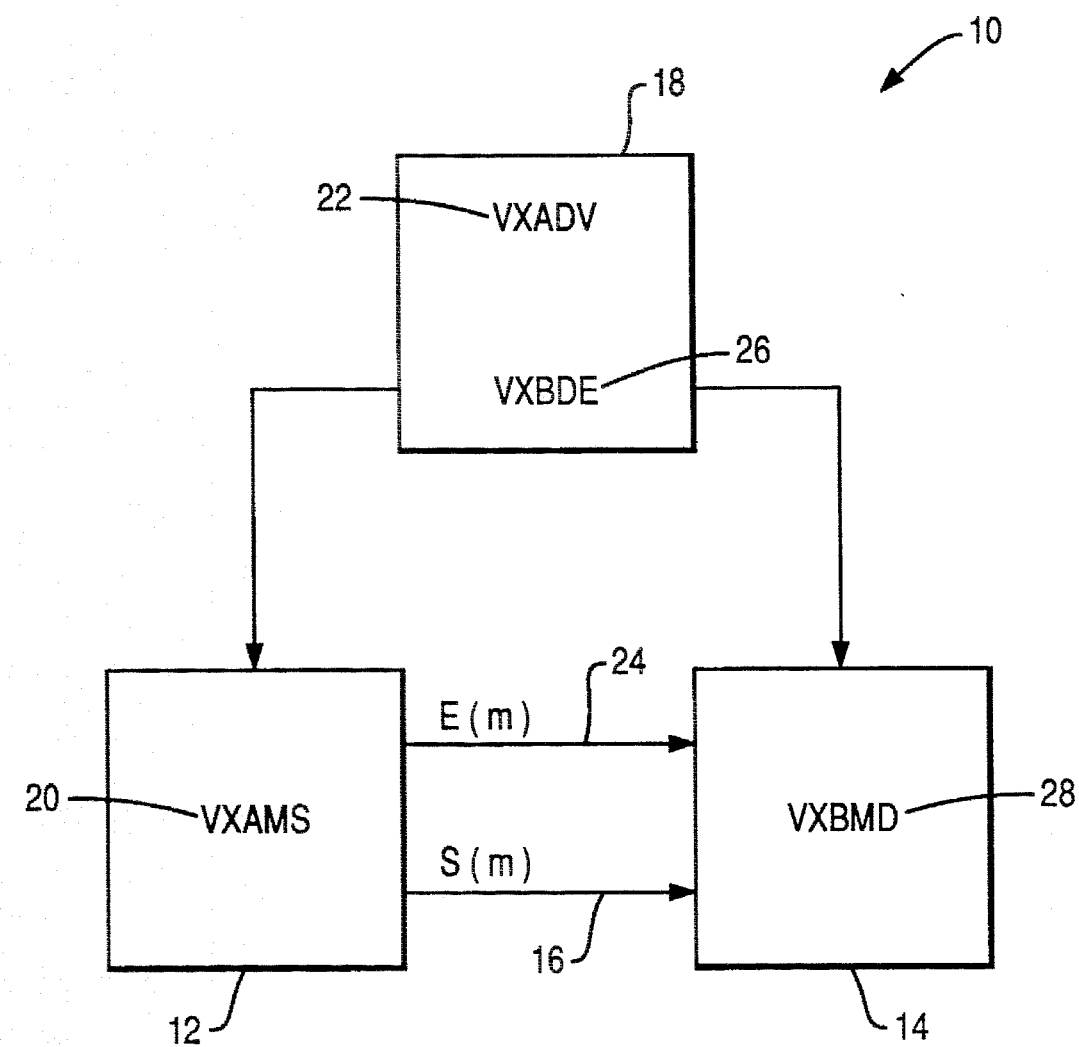
FIG. 2 is a schematic representation of apparatus embodying the present invention.

Referring to FIG. 2, the operation of the apparatus embodying the present invention is first outlined in which, within a domain 10, a domain member A 12 sends a sealed message S(M) 16 to a domain member B 14.

The domain member 12 first reads the key VXAMS 20 from the directory 18 in which the key is held. As indicated, this member vector belongs to the key domain member 12 and is arranged for seal generation. The member 12 then feeds this key VXAMS 20 into its vector key processor 11 which verifies the vector key VXAMS 20 and loads it into a cryptographic processor 13 (see FIG. 1). The member 12 inserts the name of the key VXAMS 20 into the message M to be sealed and passes the message M to the cryptographic processor 13 for sealing. The sealed message S(M) 16 obtained is then sent to the domain member 14. On receipt of the sealed message S(M), the member 14 reads the vector key name. The member 14 then obtains the key VXADV 22 from the directory 18. As indicated, this key VXADV 22 is the domain vector key associated with the domain member 12, and which is paired with the member vector key VXAMS 20 belonging to the member 12 for verifying the seal provided by VXAMS 20. Also as indicated, VXADV 22 is a domain vector key, i.e. a public key and although it is identified as belonging to member 12, being a public key it is accessible to all domain members and so can be retrieved from the directory, and used, by the member 14. Having obtained VXADV 22, the member 14 feeds this key into its vector key processor which verifies the vector and loads the key VXADV 22 into its cryptographic processor. The member 14 then passes the sealed message S(M) 16 it received from member 12 to its cryptographic processor which verifies the seal using VXADV 22 already loaded therein and passes the result of the verification back to member 14.

The following operation involves the domain member A 12 sending an encrypted message E(M) (24) to the domain member B 14.

Member 12 reads the key VXBDE 26 from the directory 18. As indicated, this key 26 belongs to, or is associated with, the domain member 14 but being a domain vector key i.e. a public key, it is accessible to all other domain members. The member 12 then feeds the key VXBDE 26 into its vector key processor 11 which verifies the vector key and loads it into its cryptographic processor 13. The member 12 appends the name of key VXBDE to the message M to be encrypted and passes message M to its cryptographic processor for encryption. It should be noted that the vector name is not encrypted. The message E(M) 24 is then sent to the domain member 14. The member 14 receives the message and reads the vector key name. The member 14 then obtains the key VXBMD from the directory. This key, as indicated is a private key, accessible only to the member 14 and which is paired with the key VXBDE 24 previously employed by the member 12 in encrypting the message to be sent to the member 14. The key VXBMD 28 is fed into the vector key processor belonging to the member B wherein its vector is verified before it is loaded by the vector key processor into the cryptographic processor. The member 14 then passes the encrypted part of the message E(M) 24 to the cryptographic processor where it is decrypted and the result passed to the member 14.

The following operation involves the secure communication between a member A in domain x and a member C in domain z, in which A sends a sealed message to C.

A reads its own member vector key VXAMS from the directory. This key VXAMS is then fed into A's vector key processor wherein it is verified and then loaded into A's cryptographic processor.

A inserts the name of the key VXAMS into the message and passes the message to the cryptographic processor for sealing. A then sends the sealed message S(M) to C. On receipt of S(M), C reads the vector name and obtains the key VXADV, i.e. the public key which is paired with the key VXAMS used for sealing the message. Having obtained VXADV, C passes this key to its domain translation facility which translates the key from the domain X key space to the domain Z key space. C then receives VZADV in return C feeds VZADV into its vector key processor wherein the key identity is verified and the key is subsequently loaded into C's cryptographic processor. C then passes the sealed message S(M) to its cryptographic processor which verifies the seal by way of key VZADV previously loaded therein. The result the verification is passed back to C.

In this latter operation involving communication between domain members in different domains, C destroys the vector key VZADV once used since A may at any time change the VXAMS/VXADV vector key pair. Senders of encrypted messages, and receivers of sealed messages, must always use the vector keys from the directory.

The vector key management apparatus of the present invention provides for a simple and open-ended cryptographic key distribution. Also, the invention does not carry out operations that are specific only to vector keys and so interaction with other key distribution systems, for example conventional systems, is possible. Thus the vector key management means is able to deliver keys generated according to the rules set by any other key management system to any member of a secure communication domain. The mapping and gateway functions between apparatus of the present invention and other key management systems can be provided in a single device or domain member, or alternatively can be distributed between many members of a domain.

A known key management apparatus is defined according to ANSI Standard X9.17 (ISO 8732) and which requires the use of counters to control the use of keys. The generation of X9.17 key values may be carried out by the gateway or by an X9.17 conformant system. In either case, the gateway provides for counter management. New keys are redefined in vector key format and stored in a directory. The domain members retrieve the keys from the directory to interchange secure messages with systems using X9.17 key management.

What is claimed is:

1. Cryptographic key management apparatus for a communication domain enabling secure communication among a plurality of domain members comprising:

a plurality of Keys for use in said apparatus comprising Master Keys and Working Keys;

said Master Keys comprising a Domain Master Key shared by all domain members and a Member Master Key unique to each said domain member;

said Working Keys comprising Domain Vector Keys and Member Vector Keys;

said Domain Vector Keys being public keys for use by said domain members and having control information therein defining said Domain Vector Keys for encryption and verification;

each said Member Vector Key being a private key for use by an associated domain member and having control information therein defining said Member Vector Key for decryption and message sealing;

each said Member Vector Key having a cryptographic key value encrypted therein using the associated Member Master Key;

said Domain Master Key being a public key shared by all domain members and used for protecting said Domain Vector Keys;

each said Domain Vector Key having a cryptographic key value encrypted therein using the Domain Master Key;

each said Member Master Key being a private key for use by an associated domain member;

each said Member Vector Key having a cryptographic key value encrypted therein using the associated Member Master Key;

a directory accessible by all domain members, with at least one Domain Vector Key and one Member Vector Key being provided for each said domain member to provide a Pair of Vector Keys, with each said Pair of Vector Keys having the same said cryptographic key value therein;

each said domain member including:

a vector key processor and a cryptographic processor;

said vector key processor receiving said Working Keys for controlling said data encryption and data decryption; and said cryptographic processor performing said encryption and decryption.

2. Apparatus as claimed in claim 1 said vector key processor and said cryptographic processor are located on a single integrated circuit.

3. Apparatus as claimed in claim 2 in which said cryptographic key value and said control information of each said Working Key are arranged as a single data structure.

4. A method of managing a plurality of cryptographic Keys by domain members in a communication domain, with said Keys including Master Keys and Working Keys, with said Master Keys including Domain Master Keys and Member Master Keys, and with said Wording Keys including Domain Vector Keys and Member Vector Keys, said method comprising the steps of:

(a) providing the Domain Master Key and the Domain Vector Key as public keys;

(b) keeping the Member Master Key and the Domain Vector Key as private keys for use by an associated domain member;

(c) performing data encryption and data seal verification on a vector key processor for said public keys; and performing data decryption and seal generation on a cryptographic processor for said private keys (d) grouping a Domain Vector Key and a Member Vector Key as a Key Pair and sharing the same cryptographic key value, with at least one Key Pair being associated with each domain member;

(e) storing said Key Pairs in a directory, and (f) sealing said Key Pairs with associated Master Keys to provide protection against vector substitution.

5. A method of managing a plurality of cryptographic Keys by domain members in a communication domain, with said Keys including Master Keys and Working Keys, with said Master Keys including Domain Master Keys and Member Master Keys, and with said Working Keys including Domain Vector Keys and Member Vector Keys, said method comprising the steps of:

(a) providing the Domain Master Key and the Domain Vector Key as public keys;

(b) keeping the Member Master Key and the Domain Vector Key as private keys for use by an associated domain member;

(c) performing data encryption and data seal verification on a vector key processor for said public keys; and performing data decryption and seal generation on a cryptographic processor for said private keys (d) grouping a Domain Vector Key and a Member Vector Key as a Key Pair and sharing the same cryptographic key value, with at least one Key Pair being associated with each domain member;

(e) storing said Key Pairs in a directory;

(f) sealing said Key Pairs with associated Master Keys to provide protection against vector substitution; and (g) carrying out message encryption and decryption in said cryptographic processor into which the Key Pairs are loaded from said vector key processor.

* * * * *